June 5, 1928.
H. E. STAMPLEY
COOKING UTENSIL
Filed Sept. 13, 1927
1,672,738
2 Sheets-Sheet 1
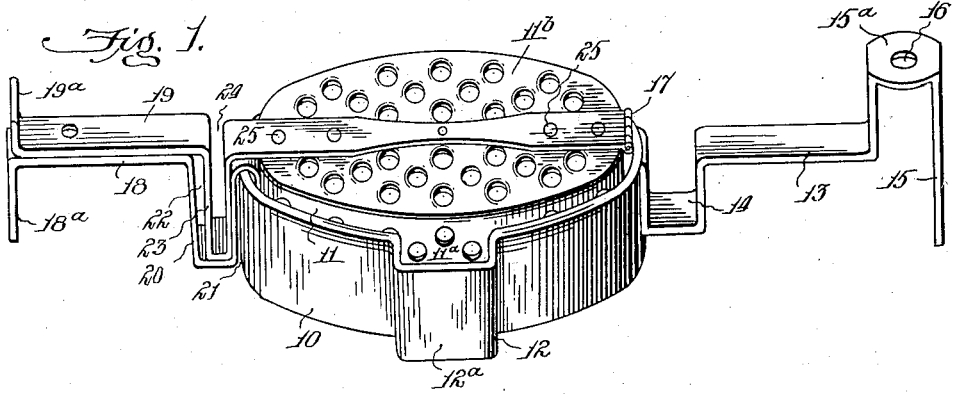
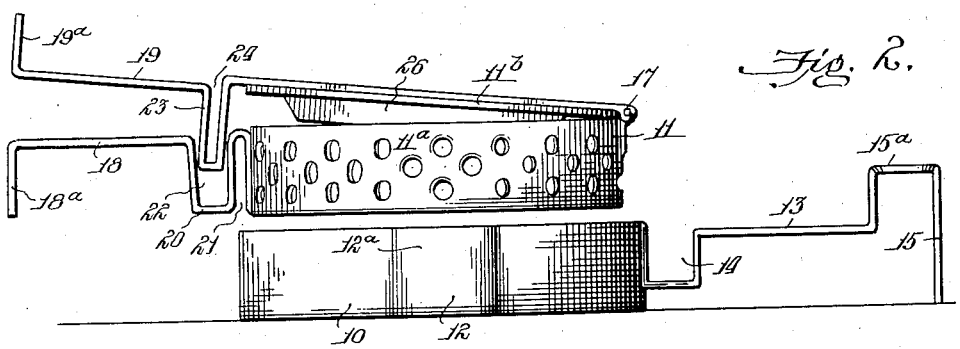
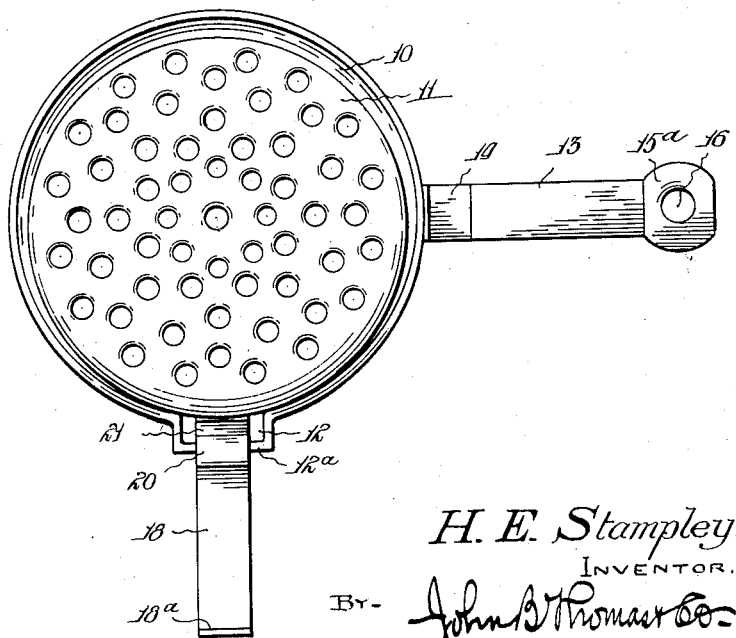
H. E. Stampley.
INVENTOR.
BY John B Thomas Co
ATTORNEYS.

June 5, 1928. 1,672,738
H. E. STAMPLEY
COOKING UTENSIL
Filed Sept. 13, 1927 2 Sheets-Sheet 2
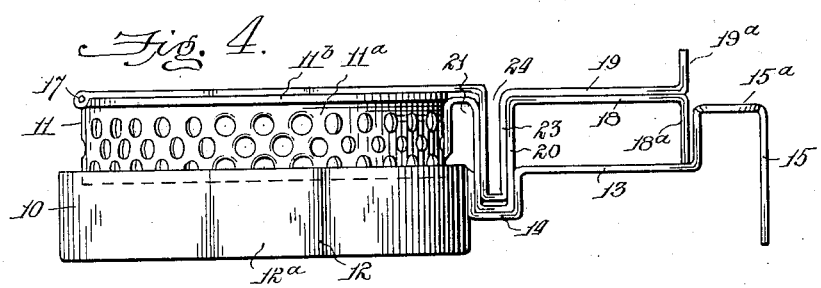
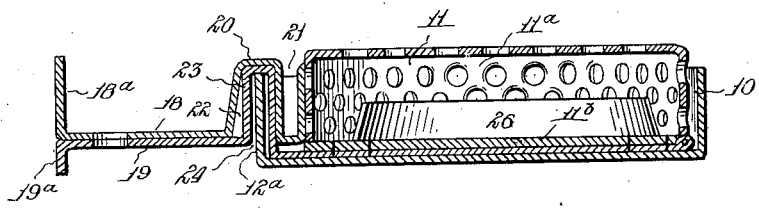
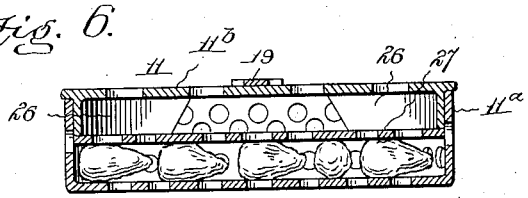
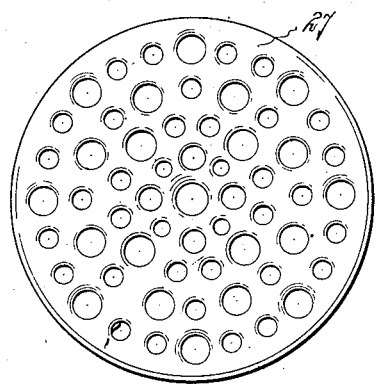
H. E. Stampley.
INVENTOR
By John B. Thomas & Co.
ATTORNEYS.

Patented June 5, 1928.

1,672,738

UNITED STATES PATENT OFFICE.

HENRY E. STAMPLEY, OF SIBLEY, LOUISIANA.

COOKING UTENSIL.

Application filed September 13, 1927. Serial No. 219,328.

My invention is an improvement in cooking utensils, and relates more especially to utensils of this kind which are employed for frying food such as croquettes, doughnuts, &c.
The primary object of my invention is to provide a frying-pan and a foraminous receptacle usable in connection therewith and in which the food to be cooked is placed, said food receptacle being herein termed a "fryer-turner" inasmuch as it is reversible in the frying-pan for more conveniently cooking the articles of food on both sides thereof.

My invention therefore contemplates the provision of a combined frying-pan and fryer-turner in which the frying-pan is of special construction to provide for conveniently handling the same as well as support the fryer-turner in different positions therein and the fryer-turner so constructed that it will properly engage the frying-pan in different positions in the operation of cooking the food and in permitting the grease to drip from said fryer-turner into the frying pan; all as hereinafter fully described and specifically set forth in the appended claims.

In the accompanying drawings:

Figure 1 is a perspective view of a combined frying-pan and fryer-turner constructed in accordance with my invention, the fryer-turner being supported in upright position in the frying-pan.

Fig. 2 is a side view thereof, the fryer-turner being in elevation.

Fig. 3 is a plan view with the fryer-turner reversed in the frying-pan.

Fig. 4 is a side view showing the fryer-turner supported by the handle of the frying-pan to permit the grease to drain from the cooked food back into the frying-pan.

Fig. 5 is a sectional view on the line 5—5 Fig. 3.

Fig. 6 is a transverse sectional view through the fryer-turner.

Fig. 7 is a detail plan view of a foraminous disk used in connection with the fryer-turner.

Referring to the drawings 10 designates the frying-pan and 11 the fryer-turner, both being preferably annular in shape with the frying-pan slightly larger than the fryer-turner to receive the same and leave an intervening space between them, and it will be noted that the rim or surrounding wall of the frying-pan is vertical to correspond with the outer wall of the food receptacle or fryer-turner although it will be obvious that the fryer-turner may be used in connection with an ordinary frying-pan having a flaring rim.

In the present instance the frying-pan is provided with an offset portion or mouth 12 at one side thereof and the handle 13 is bent as shown in the drawings to present a depressed portion or socket 14 adjoining the rim of the frying-pan with the outer end of said handle shaped angularly to provide a hand-grip 15, that portion of the handle between the socket and hand-grip being on a horizontal plane and from the outer end of which the hand-grip is bent upwardly then rearwardly and downwardly. It will be noted that the terminal portion of the handle or depending member of the hand-grip is of such length that the lower end thereof is on a horizontal plane with the bottom of the frying-pan, and that the upper portion $15^a$ of the hand-grip is widened so that it will not be weakened by the hole 16 provided for hanging the frying-pan from a nail or hook. Furthermore it will be noted that the offset portion or mouth 12 of the frying-pan, which facilitates pouring out the contents, is wider and deeper than usual whereby to provide in the present instance a vertical wall $12^a$ spaced from the rim to cooperate with the fryer-turner in the manner hereinafter described.

The fryer-turner which retains the food during the cooking operation comprises a body portion $11^a$ and cover or lid $11^b$ connected together at one side by hinge 17, the annular wall and bottom of the body portion as well as the lid being provided with holes through which the grease in the frying-pan enters to cook the food, said holes in addition to permitting the grease to freely pass into the fryer-turner also serving as sight openings so that the condition of the cooking articles may be easily observed and are therefore somewhat larger than usual. The body of the fryer-turner and lid are provided with handles 18 and 19, respectively, the handle 18 being bent upon itself to form a downwardly projecting U-shaped member 20 spaced from the fryer-turner to provide a socket 21 opening out at its lower end and an adjoining socket 22 formed by said member and opening out at its upper end, while the handle 19 is bent to form a downwardly projecting U-shaped member 23 adapted to fit within the U-shaped member 20 or socket 22 thereof and provides a narrow socket 24 opening out at its upper end. It will be understood by reference to the drawings that the socket 22 of the handle 18 receives the U-shaped member of the companion handle 19 when the lid is closed, while the sockets 21 and 24 of said handles receive the rim of the frying-pan according to the position of the fryer-turner when placed in said frying-pan; that is to say when the fryer-turner is in upright position (Fig. 1) the rim of the frying-pan enters socket 21 and when the fryer-turner is reversed, or bottom up (Fig. 3), the outwardly spaced portion of the rim or wall 12ª of the mouth enters the socket 24; whereby in both positions of the fryer-turner it is properly supported in the frying-pan. As the outer portions of the companion handles 18 and 19 lie together when the lid of the fryer-turner is closed said lid will be retained in closed position during the manipulation of the fryer-turner in cooking, and, as hereinbefore stated, the condition of the food can be watched through the holes in the fryer-turner—body portion and lid—during the cooking operation. Now after the articles of food contained in the fryer-turner are properly cooked on both sides by turning the fryer-turner in the frying-pan the grease is drained so as to drip back in the frying-pan, for which purpose the fryer-turner is mounted as shown in Fig. 4, that is turned upright and supported so that the nested U-shaped members 20 and 23 of the handles 18 and 19 will seat in the socket 14 of the handle of the frying-pan, and so that the outer ends of said handles will rest on the handle of the frying-pan the handle 18 is provided with a foot-piece 18ª, while the companion handle 19 of the lid is provided with a foot-piece 19ª to support said lid in substantially horizontal position when in open position; said foot-pieces 18ª and 19ª also serving as guards for the hand used in manipulating the fryer-turner. Furthermore, it will be noted that the foot-piece 18ª positions the companion handles 18 and 19 away from the handle of the frying-pan when the fryer-turner is positioned to drain the grease (Fig. 4) so that said handles can be grasped in removing the fryer-turner from the frying-pan. In removing the frying-pan from the stove the depending member at the outer end of the handle 13 is grasped immediately below the widened upper portion 15ª against which latter the index-finger of the hand bears in supporting the frying-pan.

The handle 19 may be attached to the lid in any desired manner, the arrangement shown providing that the metal strap from which said handle is formed extend across the top of the lid to which it is secured by rivets 25 and terminate in one member of the hinge 17 connected by pintle to the other hinge member suitably fastened to the body of the fryer-turner, that part of the metal strap extending across the lid also serving as a bearing on the bottom of the frying-pan when the fryer-turner is reversed so as to allow the grease to pass through the holes in the lid at opposite sides of said strap-member. The lid is also provided with depending flanges 26 at the opposite side edges thereof which fit within the body of the fryer-turner to brace the parts when the lid is closed and also to support a foraminous disk 27 used in cooking small articles of food to retain said articles between said disk and bottom of the fryer-turner (see Fig. 6) when the latter is reversed in the frying-pan.

From the foregoing description it will be readily apparent that the combined frying-pan and fryer-turner of my invention provides kitchen utensils or cooking vessels that may be conveniently employed in cooking articles of food such as croquettes, doughnuts, &c. inasmuch as the fryer-turner can be readily turned back and forth to cook the articles on both sides, thus overcoming the more tedious operation of turning each article separately, it being understood that the foraminous disk 27 is not used when cooking articles of such size as to occupy the space between the top and bottom of the fryer-turner, and that the cooking of the food can be watched through the holes in the several parts of the fryer-turner. Furthermore, it will be understood that both the frying-pan and fryer-turner may be used separately or independently for cooking purposes; that is the frying-pan may be used by itself for frying other articles of food not requiring the fryer-turner, and the latter may be otherwise used in cooking, rinsing vegetables and fruits in water, &c.

I claim:

1. A cooking utensil comprising a frying-pan having a handle with a socket in the upper side thereof, and a fryer-turner reversible in the frying-pan and having a handle with a depending portion fitting snugly within the aforesaid socket and forming the sole support of the body portion of the fryer-turner above the bottom of the frying-pan.

2. A cooking utensil comprising a frying-pan having a handle with a socket in the upper side thereof adjoining the body portion of said frying-pan, and a fryer-turner reversible in the frying-pan and having a handle with a depending portion fitting snugly within the aforesaid socket and forming the sole support of the body portion of the fryer-turner above the bottom of the frying-pan.

3. A cooking utensil comprising a frying-pan having a handle with a socket or seat in the upper side thereof, and a fryer-turner in the form of a foraminous food receptable including a lid hinged to the body portion, and handles extending from the body portion and lid of the fryer-turner and having U-shaped portions fitting one within the other and adapted to seat in the aforesaid socket in the handle of the frying-pan.

4. A fryer-turner for use in connection with a frying-pan comprising a foraminous body portion, a foraminous lid hinged thereto, and handles extending from the body portion and lid respectively and having U-shaped portion fitting one within the other.

5. A fryer-turner for use in connection with a frying-pan comprising a foraminous body portion and foraminous lid hinged thereto, a handle extending from the body portion and bent to provide a depending U-shaped portion presenting sockets adjoining the body portion of the fryer-turner, and a handle extending from the lid and having a U-shaped portion fitting in the U-shaped portion of the companion handle.

6. A fryer-turner for use in connection with a frying-pan comprising a foraminous body portion and foraminous lid hinged thereto, the lid having flanges projecting from opposite edges thereof into the body portion, a handle extending from the body portion and bent to provide a depending U-shaped member presenting sockets adjoining said body portion, and a handle extending from the lid and having a U-shaped portion fitting in the U-shaped portion of the companion handle; together with a foraminous disk fitting in the body portion of the fryer-turner against the inwardly projecting flanges of the lid.

7. A cooking utensil comprising a frying-pan having an offset portion or mouth presenting a vertical wall spaced from the rim and a handle having a depressed portion or socket adjoining the rim; together with a fryer-turner comprising a foraminous body portion and lid hinged thereto, and handles projecting from the body portion and lid of the fryer-turner and having U-shaped portions fitting one within the other and adapted to seat within the depressed portion or socket in the handle of the frying-pan.

8. A cooking utensil comprising a frying pan having an offset portion or mouth presenting a vertical wall spaced from the rim and a handle having a depressed portion or socket adjoining the rim and bent upwardly rearwardly and downwardly at its outer end terminating in a vertical grasping portion.

9. Same as claim 8 and including a fryer-turner comprising a foraminous body portion and a lid hinged thereto, a handle on the body portion having a depending U-shaped member slightly spaced from said body portion to provide a socket to receive the rim of the frying-pan, and a handle on the lid having a depending U-shaped member fitting in the U-shaped member of the companion handle of the fryer-turner and forming a socket to receive the rim of the frying-pan when the fryer-turner is reversed, the nested U-shaped portions of the handles of the fryer-turned being adapted to seat within the depressed portion or socket in the handle of the frying-pan.

10. A fryer-turner for use in connection with a frying-pan comprising a foraminous body portion and foraminous lid connected thereto, and a handle on the fryer-turner having sockets at the upper and lower sides thereof to receive the rim of the frying-pan in either position of said fryer-turner.

HENRY E. STAMPLEY.